(12) United States Patent
Schulnig

(10) Patent No.: US 10,800,614 B2
(45) Date of Patent: Oct. 13, 2020

(54) GRIPPING APPARATUS AND TRANSPORTING DEVICE FOR TRANSPORTING CONTAINERS

(71) Applicant: Tyrolon-Schulnig GmbH, Hochfilzen (AT)

(72) Inventor: Elmar Schulnig, Fieberbrunn (AT)

(73) Assignee: Tyrolon-Schulnig GmbH, Hochfilzen (AT)

( * ) Notice: Subject to any disclaimer, the term of this patent is extended or adjusted under 35 U.S.C. 154(b) by 0 days.

(21) Appl. No.: 16/465,893

(22) PCT Filed: Dec. 13, 2016

(86) PCT No.: PCT/EP2016/080810
§ 371 (c)(1),
(2) Date: May 31, 2019

(87) PCT Pub. No.: WO2018/108248
PCT Pub. Date: Jun. 21, 2018

(65) Prior Publication Data
US 2019/0291971 A1 Sep. 26, 2019

(51) Int. Cl.
*B65G 47/86* (2006.01)
*B65G 47/84* (2006.01)

(52) U.S. Cl.
CPC ......... *B65G 47/847* (2013.01); *B65G 47/846* (2013.01); *B65G 2201/0244* (2013.01)

(58) Field of Classification Search
CPC .... B65G 47/90; B65G 47/847; B65G 47/846; B65G 2201/0244

(Continued)

(56) References Cited

U.S. PATENT DOCUMENTS 5,711,411 A * 1/1998 Zurweller ............... B67C 3/242
198/379
6,938,753 B2 * 9/2005 Bonatti ................ B65G 47/847
198/470.1

(Continued)

FOREIGN PATENT DOCUMENTS

DE 102014111564 A1 2/2016
EP 2769942 A1 8/2014

(Continued)

*Primary Examiner* — James R Bidwell
(74) *Attorney, Agent, or Firm* — Cesari and McKenna, LLP

(57) ABSTRACT

An apparatus having a gripping device for gripping, holding and guiding, in particular, bottle-like containers which comprises a gripper arm and a bore for receiving a bearing element that fixes the gripper arm in the gripping device and a closure within a mounting of the gripper arm for moving the gripper arm from an open position into a gripping position. The apparatus achieves a reduction in the number of components as well as a miniaturizing of the gripper arm by arranging the bore to receive the bearing element that is configured as a pivot shaft and non-rotatably connected with the bearing element to transfer a pivoting motion of the bearing element to the gripper arm to move the gripper arm from the gripping position into the open position. The gripping device includes at least one pair of gripper arms. A transport device comprises a plurality of the gripping devices.

20 Claims, 13 Drawing Sheets

Figure 1:
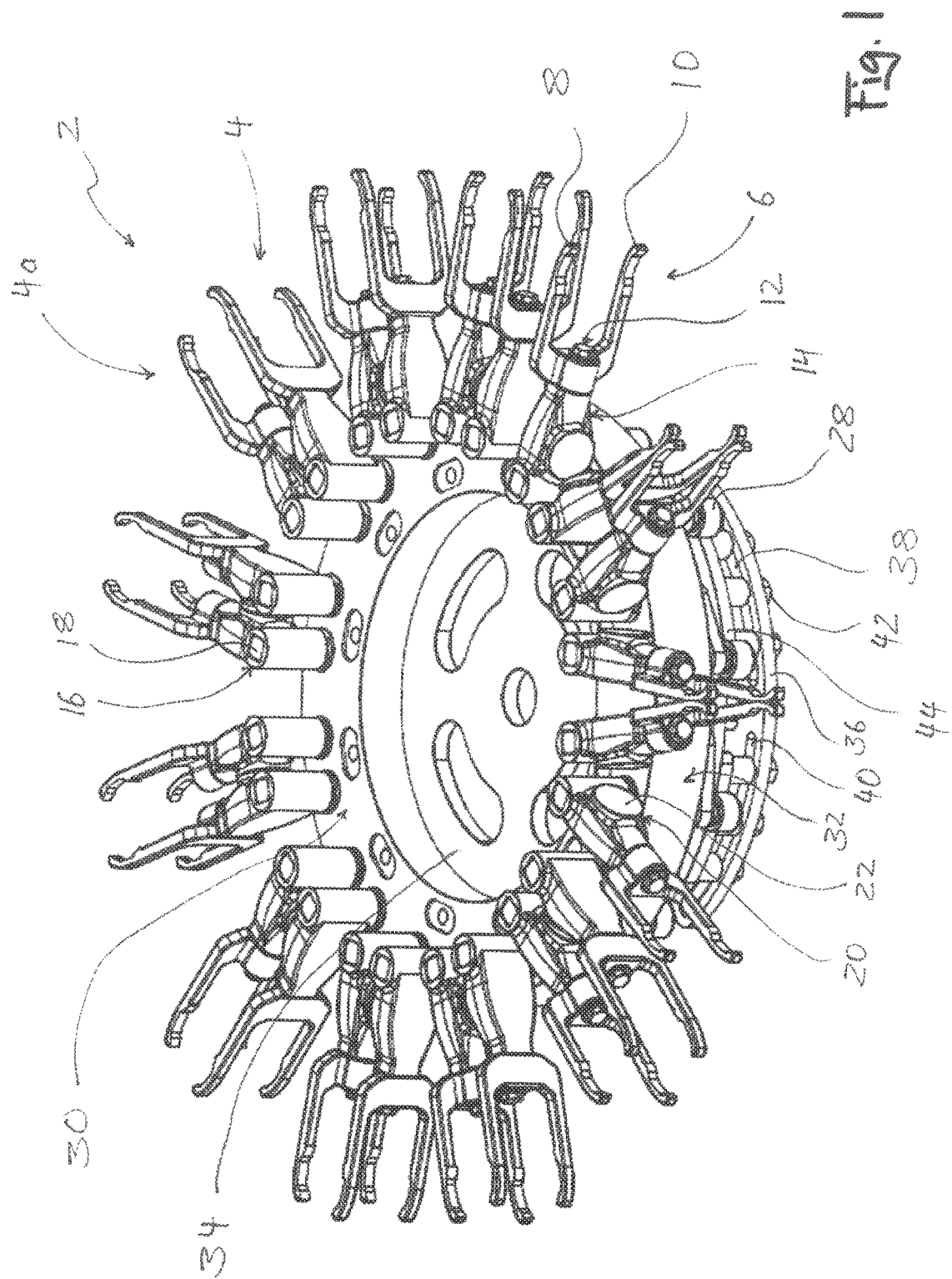

(58) Field of Classification Search
USPC .................. 198/470.1, 478.1, 867.07, 803.9
See application file for complete search history.

(56) References Cited

U.S. PATENT DOCUMENTS

| | | | |
|---|---|---|---|
| 8,002,106 B2* | 8/2011 | Preti | B65G 29/00 |
| | | | 198/459.2 |
| 9,725,290 B2* | 8/2017 | Fahldiek | B65G 47/847 |
| 2010/0013253 A1* | 1/2010 | Winzinger | B65G 17/323 |
| | | | 294/87.1 |
| 2010/0289287 A1* | 11/2010 | Preti | B65G 47/847 |
| | | | 294/116 |
| 2014/0238825 A1* | 8/2014 | Schulnig | B65G 47/90 |
| | | | 198/570 |

FOREIGN PATENT DOCUMENTS

| | | | |
|---|---|---|---|
| EP | 2881345 | A1 | 6/2015 |
| EP | 2907777 | A1 | 8/2015 |
| WO | WO-2010/048765 | A1 | 5/2010 |

* cited by examiner

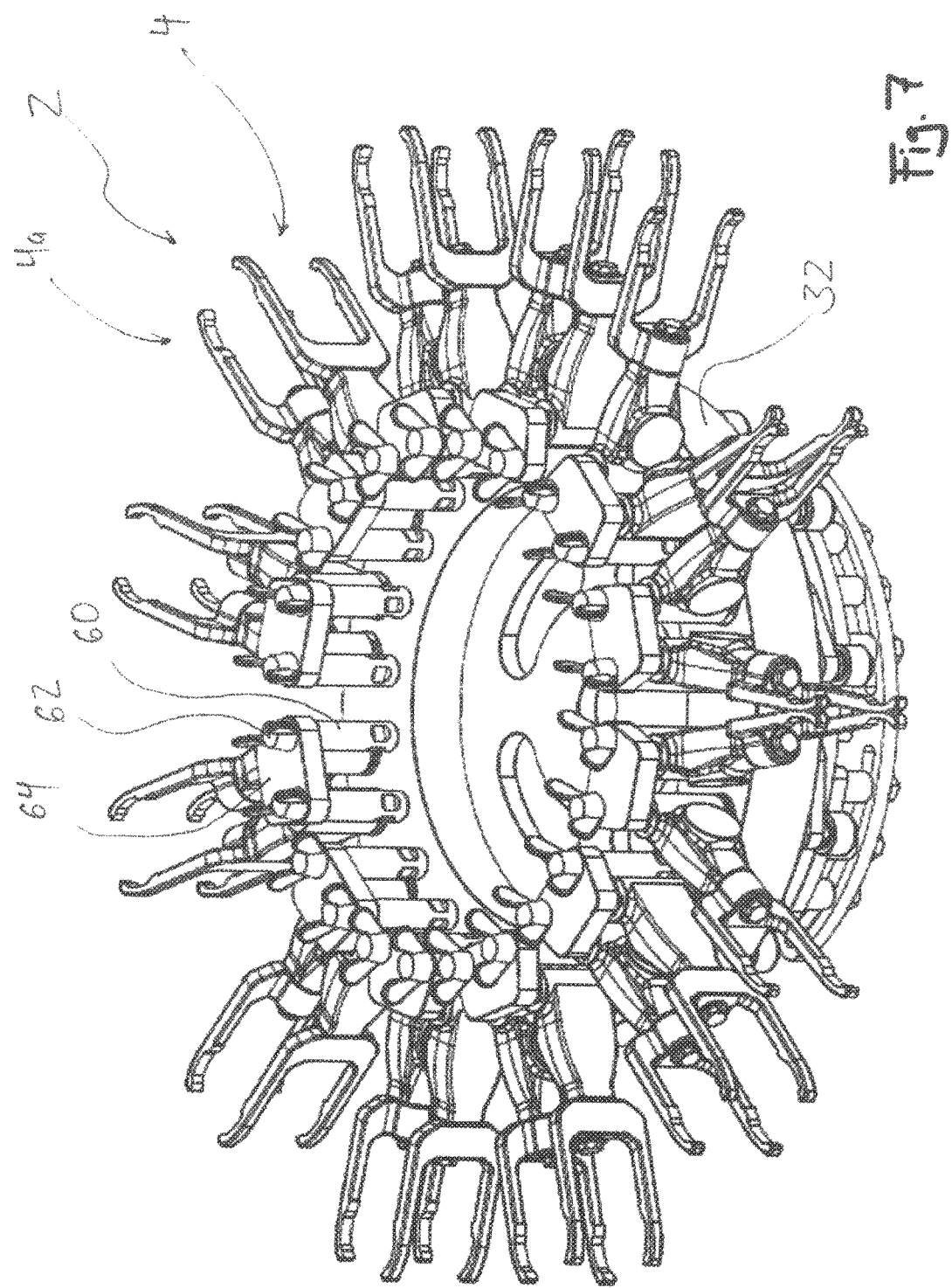

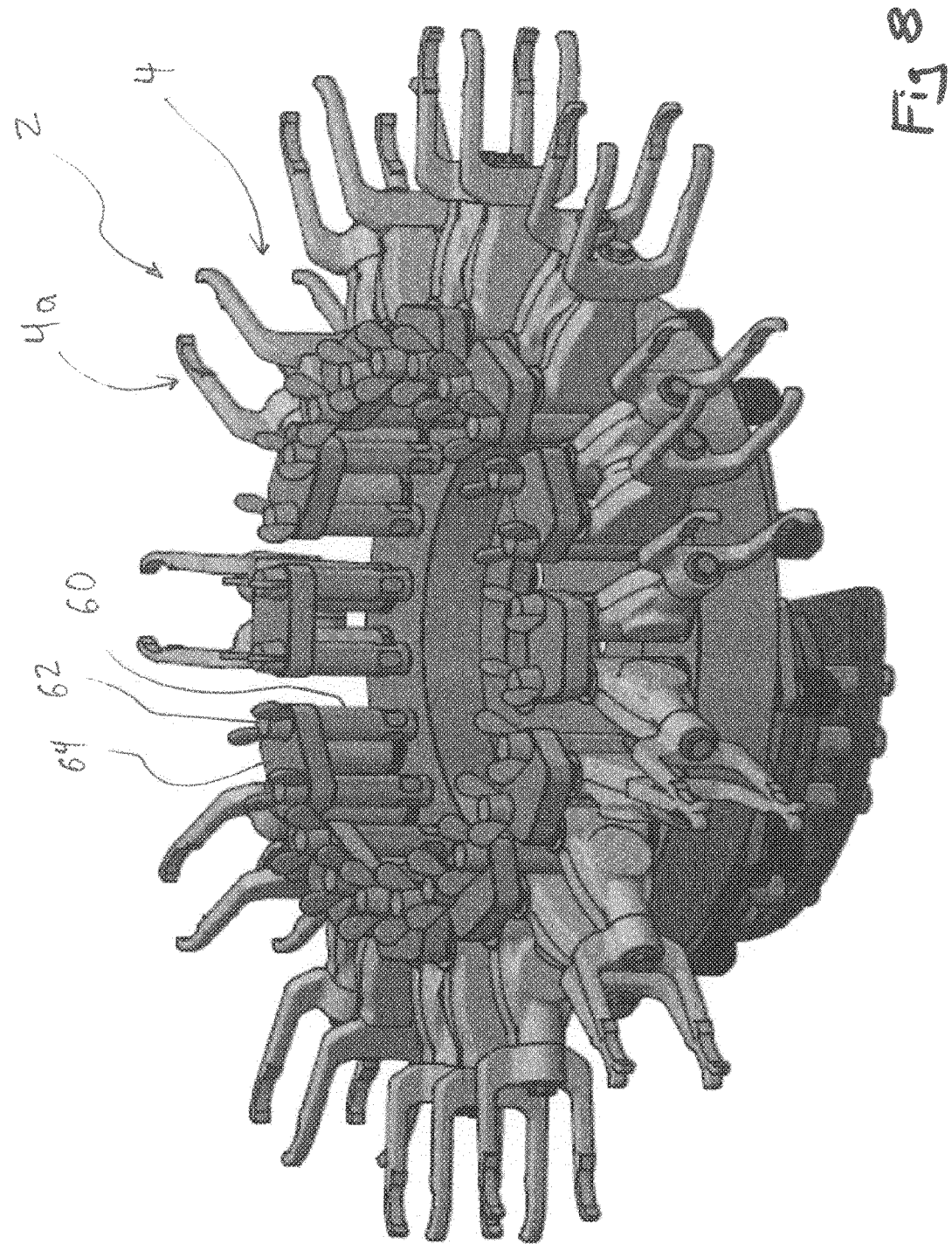

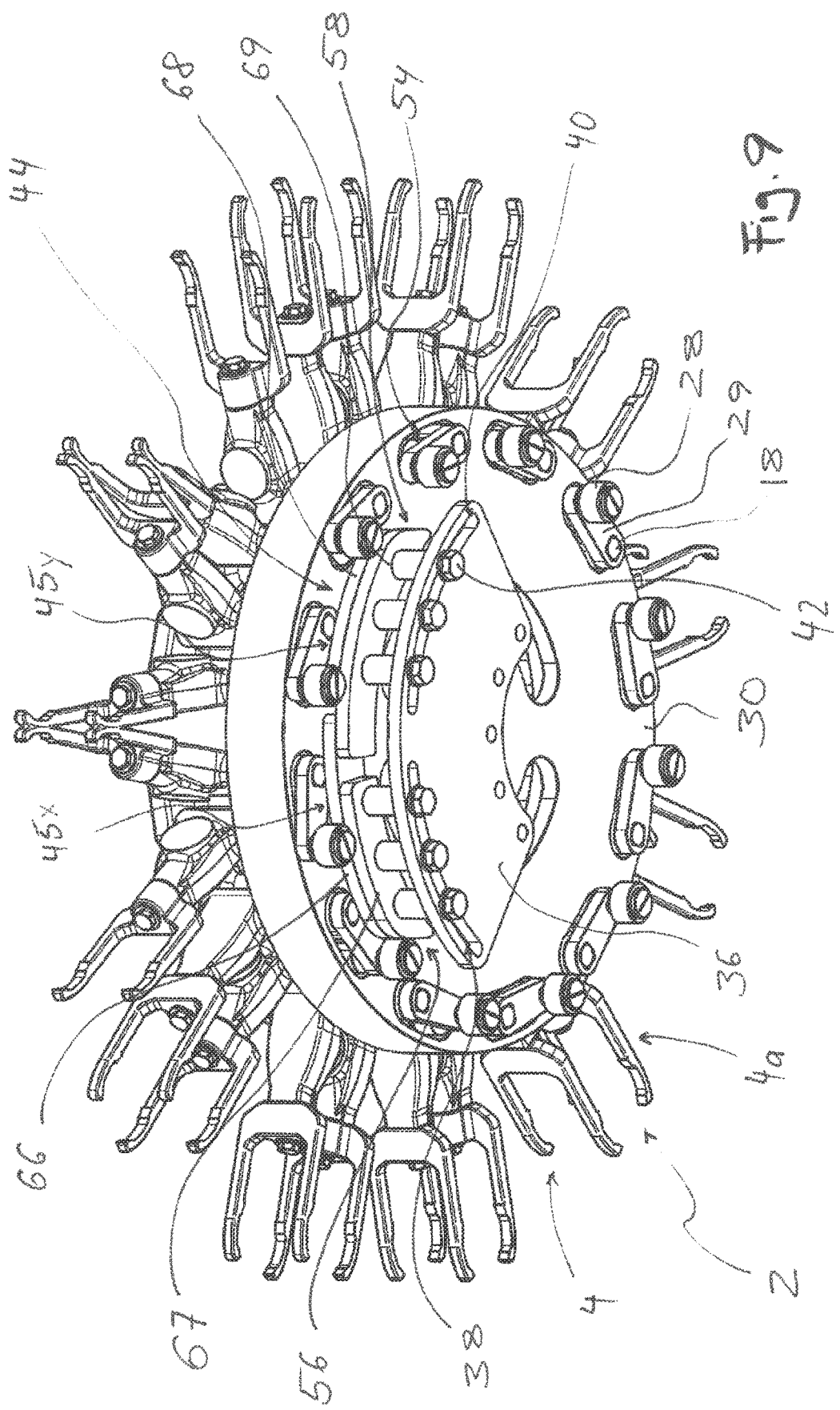

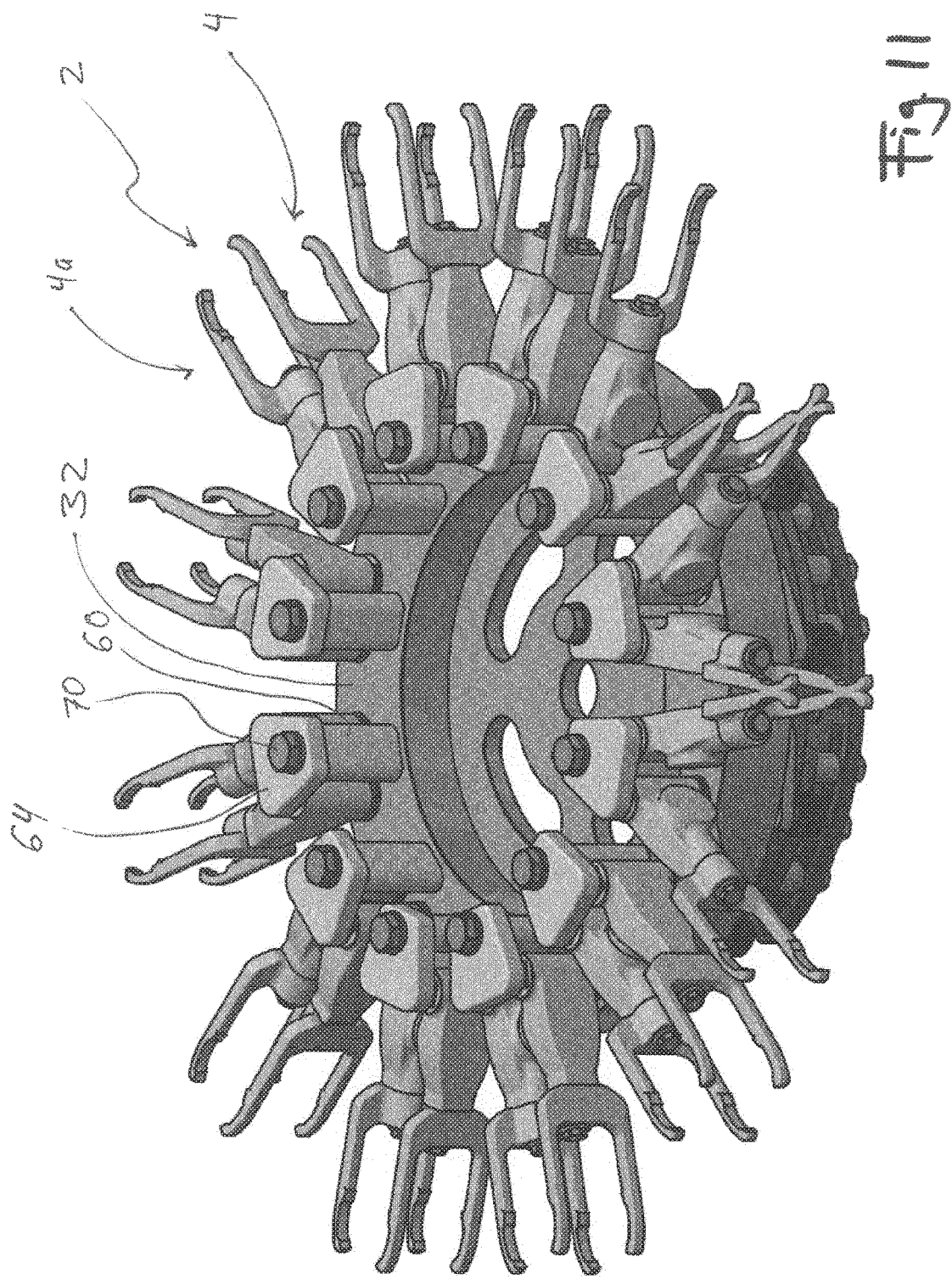

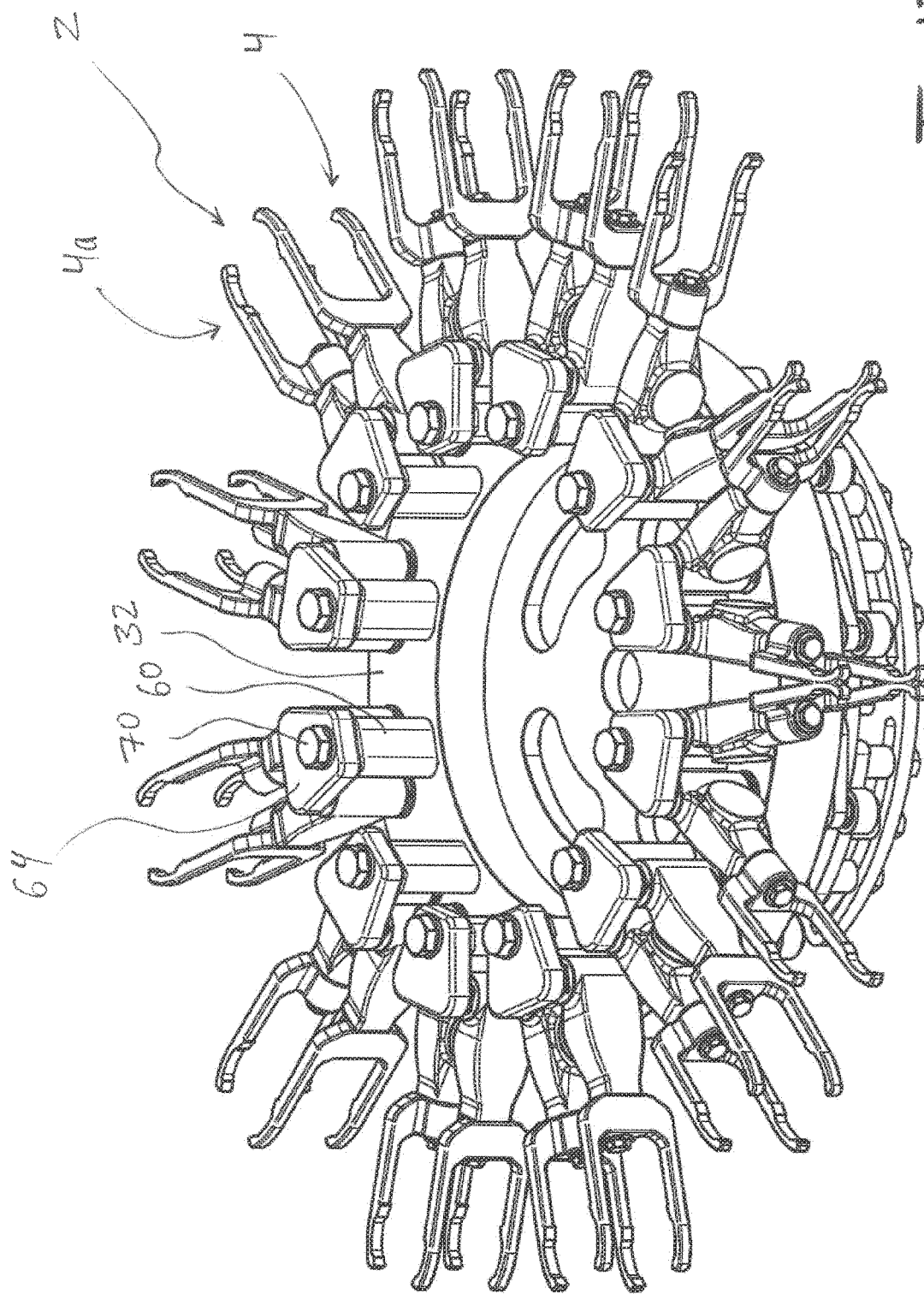

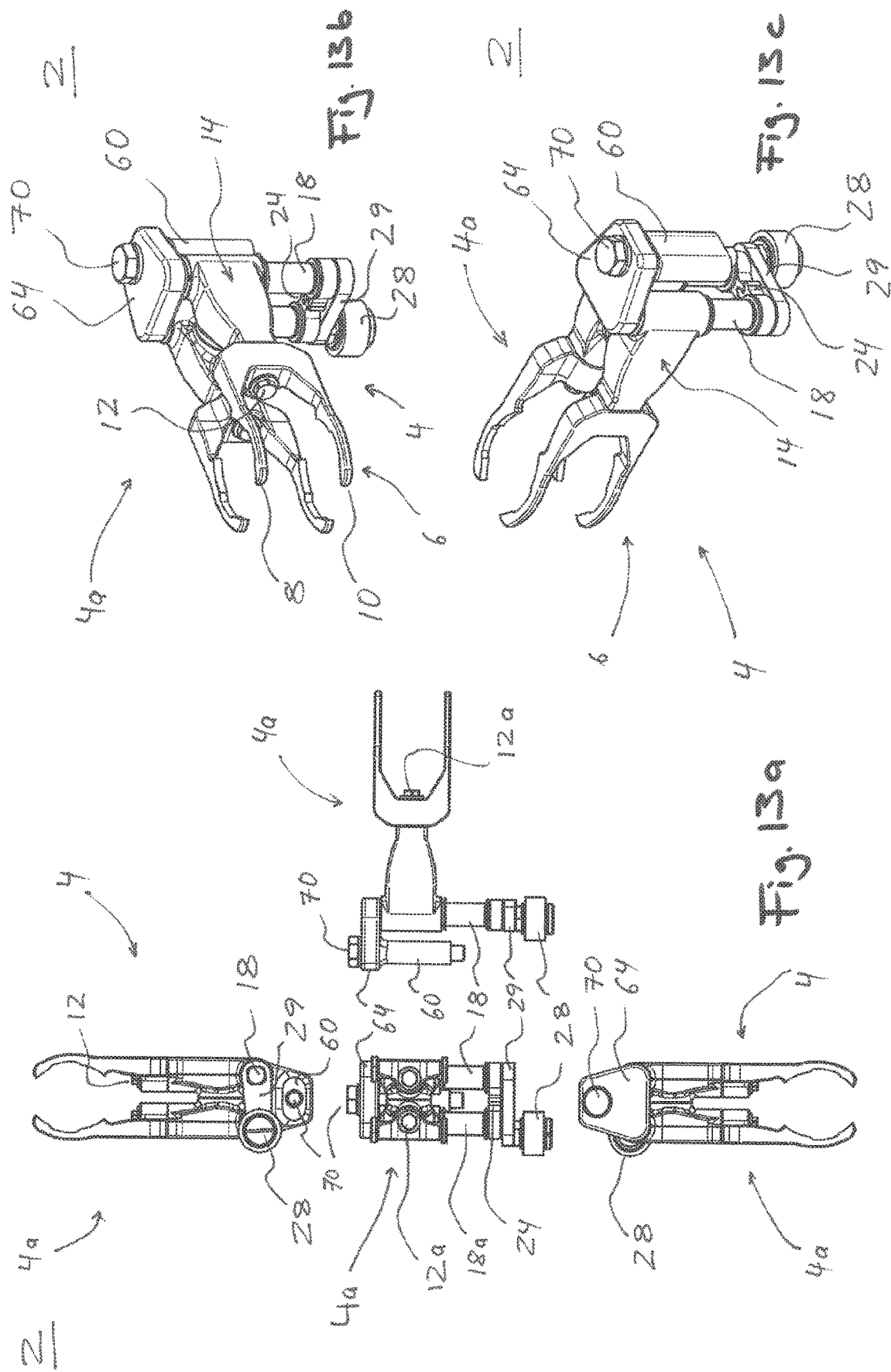

GRIPPING APPARATUS AND TRANSPORTING DEVICE FOR TRANSPORTING CONTAINERS

CROSS REFERENCE TO RELATED APPLICATIONS

This application is the National Stage of International Application No. PCT/EP2016/080810, filed Dec. 13, 2016, the contents of which are hereby incorporated by reference in its entirety.

TECHNICAL FIELD

The present disclosure relates to gripping apparatus for gripping, holding and guiding containers, in particular, bottle-like containers.

The present invention relates to a gripper arm for a gripping device for gripping, holding and/or guiding in particular round containers, a gripping device and a transport device for transporting such containers.

Gripping devices for gripping, holding and/or guiding in particular round containers, also referred to as "clamping units," are already known from the prior art and used in the production line processing of containers.

To be understood by the term "container" in the context of the present invention is in particular, but not exclusively, containers having a substantially circular cross section, e.g. bottles, cans or glassware, which can in each case traditionally consist of glass, metal or plastic. Small containers such as vials or small canisters as particularly used in the pharmaceutical or cosmetic industry can also be understood in this context.

To be understood by the term "substantially/particularly round" in the context of the present invention is not solely round containers in the geometrical sense but for example also oval, regularly polygonal, etc., which then in particular exhibit a substantially circular cross section but also e.g., oval or polygonal cross sections.

The terms "pivotable" or "rotatable" as used in the following refers to the ability or characteristic respectively of a structural component to move or be movable (rotatable) about an axis.

Included within the scope of production line processing of containers is the cleaning, filling and sealing of the containers. During cleaning, filling or sealing, the containers are gripped at an entry point station by means of a gripping device having at least one pair of gripper arms as known from the prior art and then transported to the next station in the processing chain. Such a gripping device for a container transport system has at least two gripper arms and can alternate between a gripping position and an open position. To transport a container, the gripper arms normally grasp underneath the collar, particularly in the case of bottles, and/or around the mid-section of the container. A control cam thereby functions as an opening means and a spiral spring as a closure means for the gripping device. The spring force of the spiral spring thereby serves not only in closing the gripping device but also in the force-locked holding of the container. The spring force is therefore dimensioned correspondingly large. When the gripping device is opened by the control cam or conveyed into the open position respectively, a force is expended against an inner face of the gripper arm against the spring force. To convey the gripping device into the gripping position, the control cam is rotated such that the gripper arm pair of the gripping device is no longer deflected or forced apart by the control cam and the gripper arms are moved toward each other and closed by the closure means.

Due to the numerous components of the gripper arm and the gripping device, their manufacture and installation complexity as well as their maintenance and cleaning upkeep are relatively high. Dirt accumulates on the gripper arm pairs particularly in recesses, corners and between components and is undesirable in hygiene-critical processes such as bottling pharmaceuticals or sanitary products as well as also food. In addition, scaling down the size of the gripper arm or the gripping device, which is of advantage when guiding and holding small vials, is not readily possible due to the spiral spring or the control cam and the space that they require.

It is therefore the task of the present invention to advantageously further develop a gripper arm for a gripping device, a gripping device as well as a transport device of the initially noted type, particularly to the effect of enabling a miniaturizing of the gripper arm and a reduction in the number of structural components of a gripping device, and in particular to the effect of reducing the maintenance for a gripping device and simplifying its structure and installation.

The gripper arm and gripping device control is to likewise be simplified and made more flexible.

The invention solves this task with a gripper arm having the features of claim 1.

Accordingly provided is the provision of a gripper arm for a gripping device for gripping, holding and guiding in particular bottle-like and/or round containers which is furnished with a bore for receiving a bearing element for fixing the gripper arm in the gripping device and with a mounting for a closure means for moving the gripper arm from an open position into a gripping position. The bore is thereby configured so as to receive a bearing element designed and/or functioning as a pivot shaft and to non-rotatably connect with the bearing element in order to transfer a pivoting motion of the bearing element to the gripper arm to move the gripper arm from the gripping position into the open position.

The gripper arm itself is at least conceptually divisible into different regions or even into individual components, in particular a gripper arm body with said bore and mounting as well as a grip section having at least one gripper finger for gripping and holding a container.

Compared to the prior art, the gripper arm according to the invention is actuated by a pivot shaft, enabling the dispensing with of the control cam (with its own rotational axis) as used to date in a gripping device and an actuating surface on the gripper arm for the control cam. The inventive gripper arm thus offers the advantage of enabling the miniaturizing of a gripper arm for a gripping device. The bore, the mounting for a closure means as well as the grip section can thus be arranged directly next to each other, whereby the length of the gripper arm between the bore and the grip section is reduced. By eliminating the actuating surface, the mounting for the closure means can be configured closer or respectively directly adjacent to the bore. A closure means, in particular a pair of magnets, can thereby be located closer to each other in the open position or during gripping and thus exert a much greater holding force (attractive or tensile force between the magnets) on the container to be transported. Heavy, filled and unwieldy containers, for example without any grooves or recesses for a better grip, can thus be held in more stable and secure manner.

The fewer number of structural elements and components of the gripper arm and gripping device enables a simpler structure to the gripper arm as well as the gripping device which is easier to manufacture, install and service. The bore of the gripper arm and in particular the pivot shaft are configured so as to not only position the gripper arm at a specific position but also non-rotatably connect the pivot shaft with the bore, in particular positively and/or frictionally or materially, in order to transfer a pivoting motion of the pivot shaft to the gripper arm (and vice versa). Two functions are thus combined in one component, the bore or respectively the bearing element functioning as the pivot shaft. Furthermore, compared to the prior art, the number of movable/pivotable components is reduced and the gripper arm and the gripping device require less maintenance and are easier to service. The term "positively" applies inter alia to an non-releasable connection, such as for example the pivot shaft being press-fit into the bore, or a releasable connection in which a correspondingly designed pivot shaft can be introduced into a complementary configured bore and a rotation of the pivot shaft can be transferred to the gripper arm. For example, the cross section of the pivot shaft and that of the bore is at least partially star-shaped, elliptical, polygonal or square-shaped (or other shape) in order to jointly enable a releasable and non-rotatable connection. A releasable non-rotatable connection yields the advantage of the gripper arm being able to be replaced faster without needing to replace the pivot shaft. The term "materially" applies inter alia to the material bond resulting from soldering, welding or gluing.

A further advantage of the gripper arm according to the invention lies in the fact that accumulations of dirt and grime are reduced, particularly during the operation of the device, and the gripping device only needs to be cleaned after longer periods of time and thus requires less maintenance. In particular, the inventive gripper arm offers the advantage that recesses in which dirt, dust and/or other contaminants especially accumulate are on the one hand almost completely eliminated and/or on the other hand are on the far side from the containers to be gripped. As a result, the surfaces on which grime and contaminants can take hold such as, for example, surface depressions, are considerably reduced. This thus yields a gripping device meeting the highest hygienic standards as the gripping device can be provided with gripper arms which attract no or little dirt or are not prone to contamination at process-relevant spots respectively. This is accompanied by a significant reduction in cleaning activity since the gripper arm is designed with fewer components.

A gripping device comprising the inventive gripper arm is in particular part of a transport device or container transport system respectively, also referred to as a "clamping star." The containers held by the transport device can be cleaned, filled or sealed during transport and/or be transported to the next station in the process.

Advantageous further developments of the invention are set forth in the subclaims. It is hereby to be noted that the different embodiments and in particular their features are in each case combinable with one another.

The gripper arm thus preferably comprises at least one effective engagement section, in particular a toothed section with teeth arranged coaxially at least in segments around the bore on the gripper arm inner side, for the synchronous pivoting of the gripper arm with a gripper arm of the gripping device of mirror-inverted configuration. The advantage of the design lies in the pivoting motion of the first gripper arm being synchronously transferred to the second gripper arm and the second gripper arm not needing any control cam or the like as opening means. The pivoting motion of the first gripper arm can be transferred directly to the second gripper arm by the design of the effective engagement section on the gripper arm.

Alternatively or additionally to the effective engagement section on the gripper arm, the pivot shaft advantageously additionally comprises at least one effective engagement section, in particular a toothed section having teeth arranged coaxially at least in segments around the pivot shaft on the gripper arm inner side, for the synchronous pivoting of the gripper arm with a pivot shaft of a gripper arm of the gripping device of mirror-inverted configuration. Identical to the previously cited advantageous further development, the advantage of the present design lies particularly in the pivoting motion of the first gripper arm being synchronously transferred to the second gripper arm and the second gripper arm not needing any control cam or the like as opening means. An additional advantage is yielded by the effective area section not necessarily lying in the effective area or respectively range of motion of the gripper arms due to its arrangement and/or design and thus being better protected against contamination. The effective engagement section can either be formed directly on the pivot shaft or be ring-shaped and pushed onto or respectively fixed to same.

It has also proven to be advantageous for an actuating element for actuating the pivot shaft to be configured on the pivot shaft. The pivot shaft itself thus does not have to be actuated directly per se since the shaft can be difficult to reach. The shaft can be configured as a rectilinear and at least partially cylindrical rod. Instead of that, an actuating element is provided which is designed to open a gripping device as a function of the actuating mechanism and thus represents a form of reliable and durable control. The actuating element can thereby be of cylindrical configuration, in particular rotatable, and/or from plastic or with a plastic layer for cushioning when interacting with an actuating mechanism. The actuating element can thereby be fixedly connected to the pivot shaft, particularly at its end or beginning, preferably by an actuating lever, in order to improve the actuating of the gripper arm by means of the appropriate force and movement of the lever on the pivot shaft; i.e. producing slower, faster or even more precise actuation.

The gripper arm preferably comprises a grip section designed as such which is pivotally supported about a pivot axis running perpendicular to the bore. This enables containers in a crooked or tilted state to be stably and reliably gripped and held by the gripper arms of a gripping device. The pivot axis can thereby function as a connective element between the gripper arm body and grip section, whereby at least the gripper arm body or the gripper arm section is pivotally supported about the pivot axis. The pivot axis can either be formed as a separate component or integrally with the gripper arm body or integrally with the grip section. The pivotable grip section also holds the advantage of the at least two gripper fingers only being connected to one gripper arm body and each gripper finger not needing to be moved by its own gripper arm body.

Furthermore, the mounting is preferably designed as a blind hole arranged between the grip section and the bore, particularly in a gripper arm body of the gripper arm. This type of mounting allows the securing of closure means, in particular a magnet, without any further fixing means and only by being press-fit into the gripper arm or the gripper arm body respectively.

Advantageously, the closure means is designed as a magnet of an attracting or repelling pair of magnets. The magnet can be a permanent magnet or a magnetic field generating coil with or without a core. The effect this thereby achieves is a non-contact force—repulsion or attraction—between the gripper arms of a gripping device, which is of advantage to maintaining hygiene. With an attracting magnet pair, the magnet and thus its mounting is arranged between the grip section and bore, and with a repelling magnet pair, on the mirrored side of the gripper arm to the bore or between the end of the gripper arm and the bore respectively.

Likewise proven advantageous is for the pivot shaft and the gripper arm to be integrally formed together as one piece. The gripper arm, in particular the gripper arm body, can thus be economically manufactured in one piece, e.g. by plastic injection molding, and in particular from fiber-reinforced plastic, and readily introduced into a gripping device and actuated. This does away with forming the bore in the gripper arm and the inserting and non-rotatable connecting of the pivot shaft with the gripper arm, thereby saving time and money. Meaning that compared to the prior art, the inventive gripper arm can also be manufactured without a bore; provided an axle or shaft is formed on the gripper arm during its manufacture. The bore can likewise be eliminated when the pivot shaft and/or the gripper arm exhibit a suitable mounting or mechanism for reciprocal non-rotating connection.

The gripper arm body of the gripper arm can be made from plastic or metal, in particular stainless steel. The same applies to the grip section of the gripper arm. Gripper arms, in particular the gripping body, are thus preferentially made of metal in the case of hygiene-critical transport processes/mechanisms. A closure means, in particular a permanent magnet, can be inserted into the gripper arm body and covered by a metal cap. This cap is thereafter e.g. laser-welded to the gripper arm body in order to prevent dirt-attracting recesses in the gripper arm. Due to its resilience and/or non-slip surface, a grip section made of plastic has the advantage of achieving a more stable grip on/around the container without damaging the container during gripping or transport.

The present invention likewise relates to a gripping device for gripping, holding and guiding in particular bottle-like containers which comprises at least one pair of gripper arms formed by a first gripper arm according to the invention as well as a second gripper arm according to the invention of mirror-inverted configuration, two pivot shafts for the at least one gripper arm pair of the gripping device, an actuating element configured on one of the pivot shafts for actuating the pivot shaft, and a closure means for moving the pair of gripper arms from an open position into a gripping position, wherein a part or a first section of the closure means is arranged in the first gripper arm and another part or respectively second section of the closure means is arranged in the second gripper arm.

This thereby results in the aforementioned advantages of a lower number of components compared to conventional gripping devices and the opening means being able to simultaneously serve as a bearing and/or fixing element for a gripper arm of a gripping device, particularly in a transport device.

The present invention furthermore relates to a transport device for transporting containers comprising a plurality of gripping devices according to the invention, a support plate for accommodating the gripping devices, a drive shaft for rotating the support plate, and an actuating mechanism for controlling the respective actuating elements. Particularly because of its form, the actuating mechanism is also referred to as a cam device, cam control, cam element or cam component respectively. This thereby results in the advantage of the transport device being suited to rotate both clockwise as well as counterclockwise without any further modifications and being suited to transporting. This is in particular due to the shape and design of the actuating mechanism as well as the actuating element of the gripping devices, whereby the actuating mechanism and the actuating element can engage regardless of the support plate's direction of rotation and thereby control the gripping devices.

The actuating mechanism is preferably fixed in one position and designed so as to drive each actuating element between a first and a second position/angularity of the respective gripping device such that the gripping device is shifted into the open position, held in the open position at a certain angle, and thereafter conveyed into the gripping position.

Moreover, it is advantageous for the support plate to have two bearing bores for each gripping device for the rotatable mounting of the pivot shafts, and wherein the effective engagement section of the pivot shafts is arranged beneath the support plate. This enables economical manufacture of the support plate since only two bores are needed for the pivot shafts of the respective gripping devices.

An alternative implementation of the support plate having proven advantageous is the support plate having two bearing bores for each gripping device for the rotatable mounting of the pivot shafts as well as a countersink connecting the two bearing bores, and wherein the effective engagement section of the pivot shafts of the respective gripping devices is arranged inside the countersink. This thereby results in the advantage of the drive mechanism created by means of the two intermeshing effective engagement sections for transferring the pivoting motion from one gripper arm to the other gripper arm of the same gripping device being better protected from dirt and other foreign bodies as well as from external influences. Furthermore, the transport device is thereby of a more compact and smaller structure.

In order to improve the mounting and securing of a gripping device on the support plate, preferably each gripping device exhibits an attachment element (bearing cap) for the rotatable supporting of the pivot shafts, whereby the attachment element is fixedly connected to the support plate. This thereby results in a better compensating of the leverage forces on the pivot shafts and their bearing when gripping and holding containers, preventing material wear and extending the operational life of the transport device (keyword low-maintenance).

The following description refers to the accompanying drawings illustrating preferential exemplary embodiments and clarifies further features and advantages of the invention. It is emphasized that parts of the figures are identical or similar and the description of the figures only applies when needed to the differences between the drawings.

Figure 2:
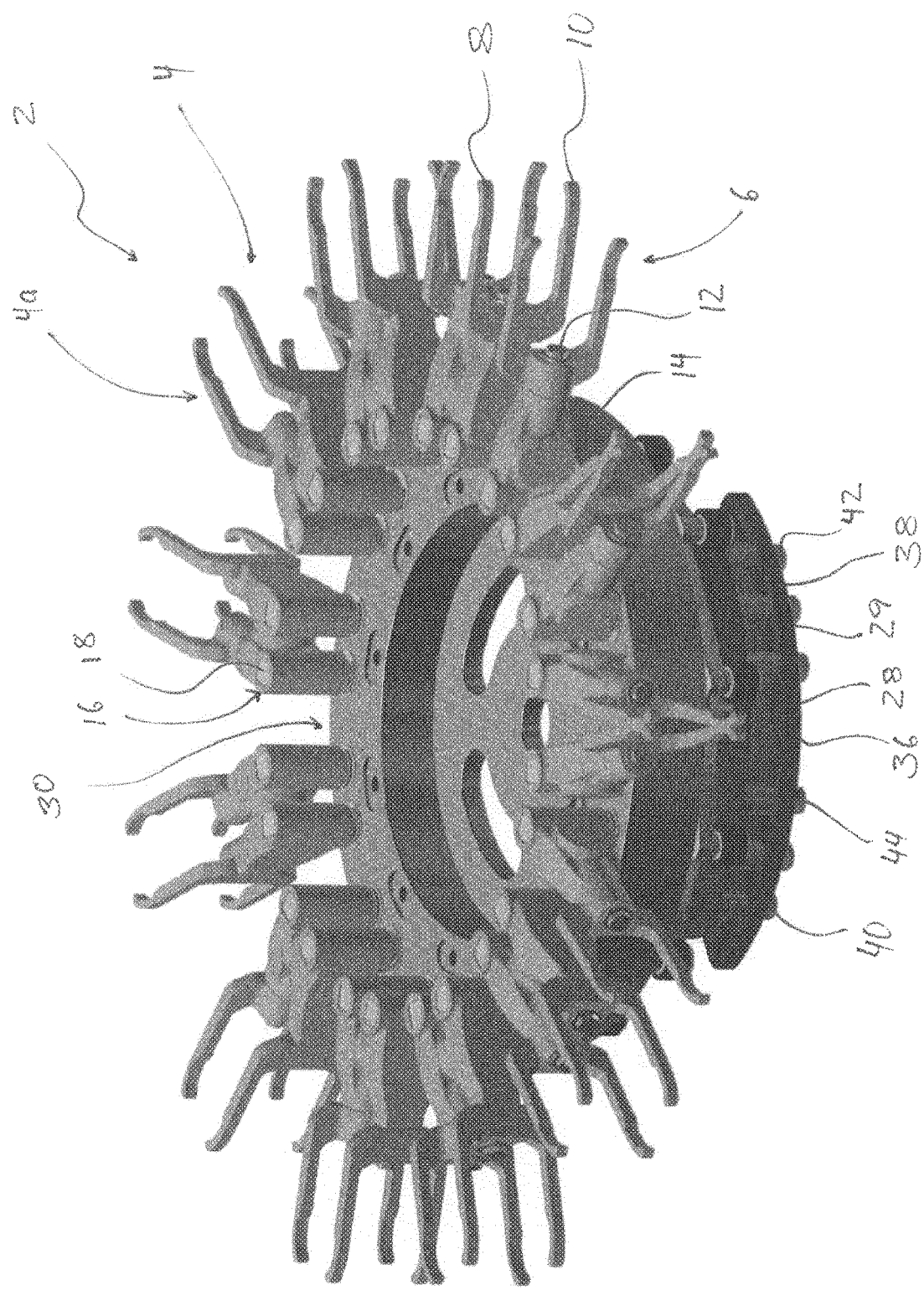
Figure 3:
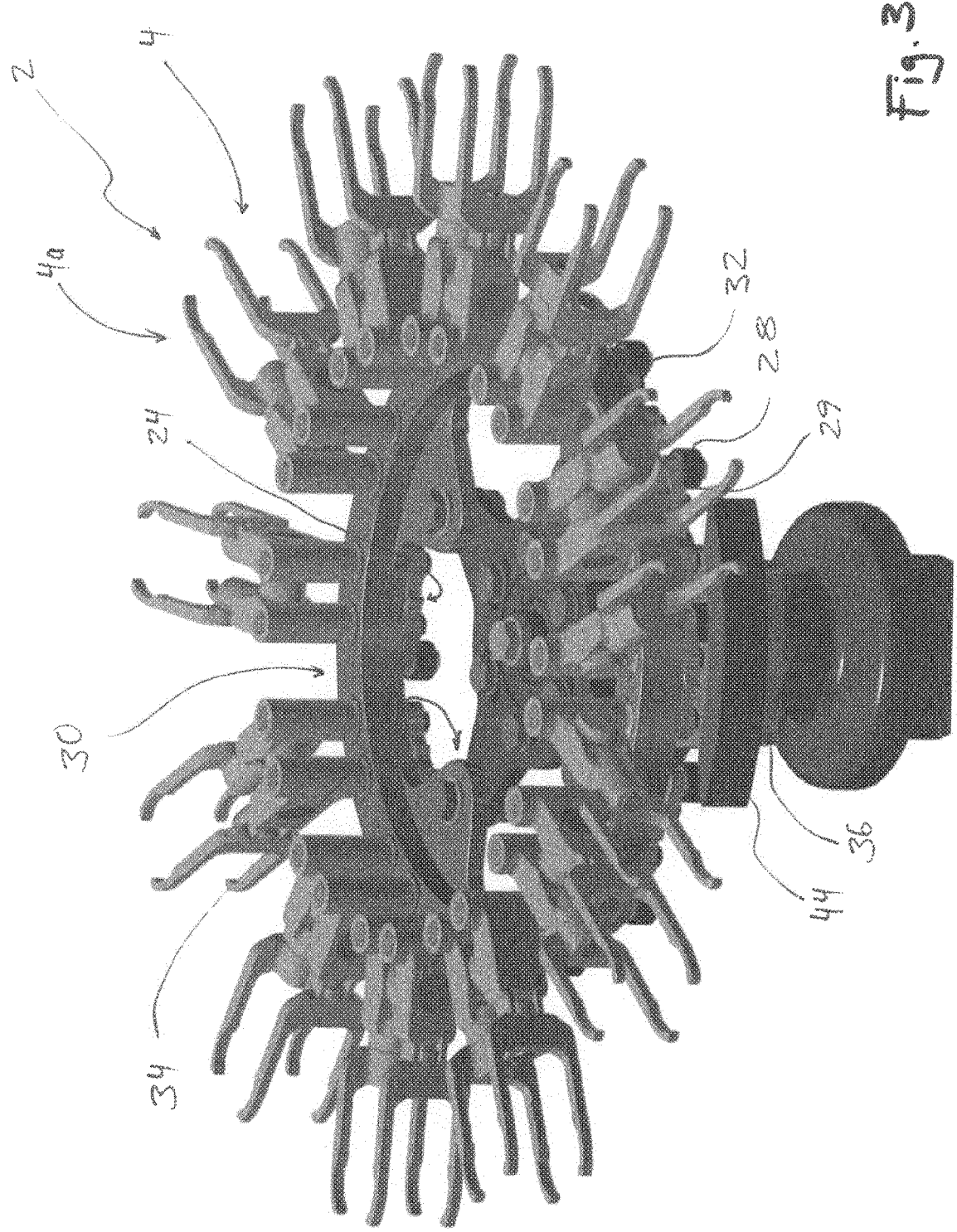
Figure 4:
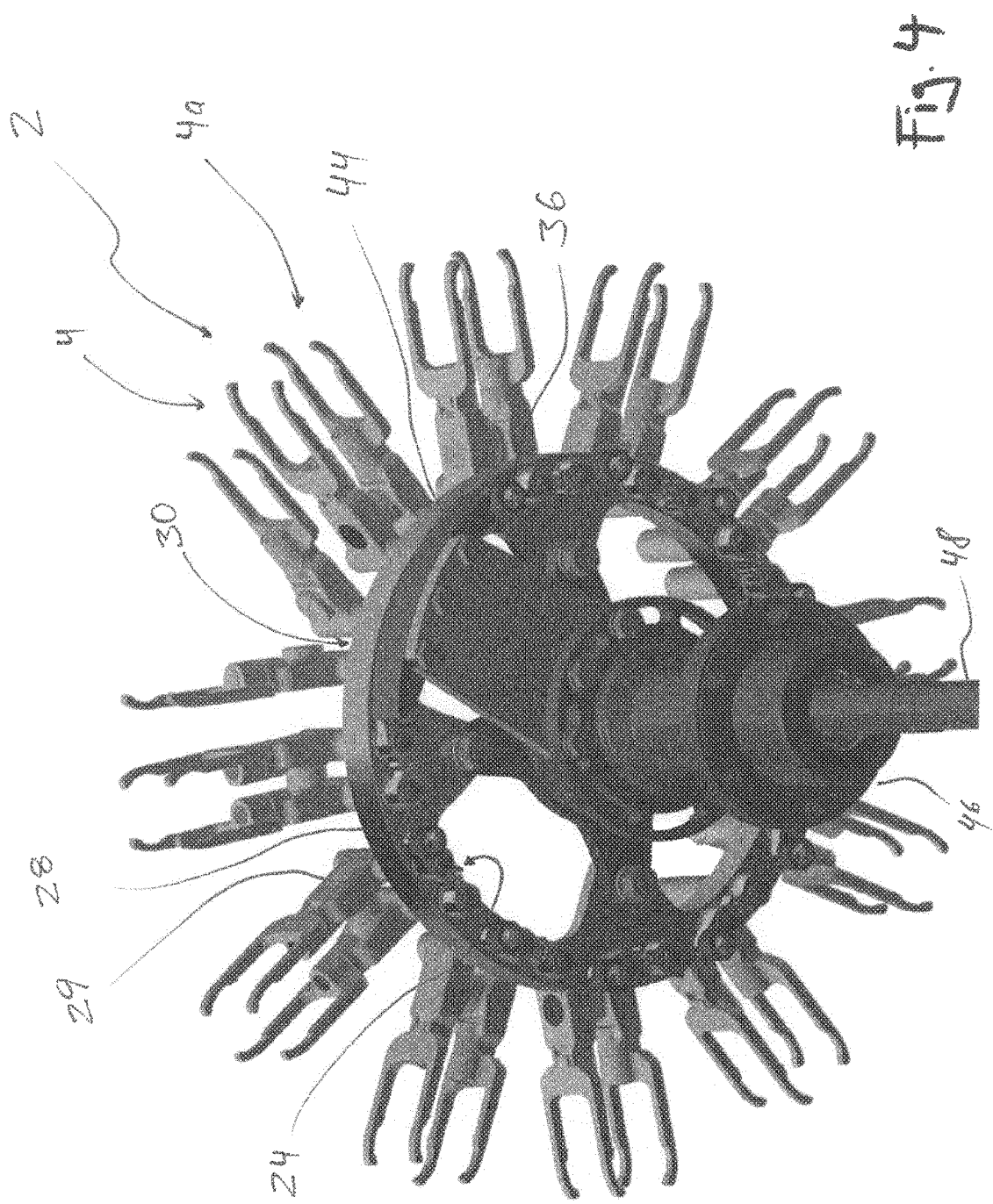
Figure 5:
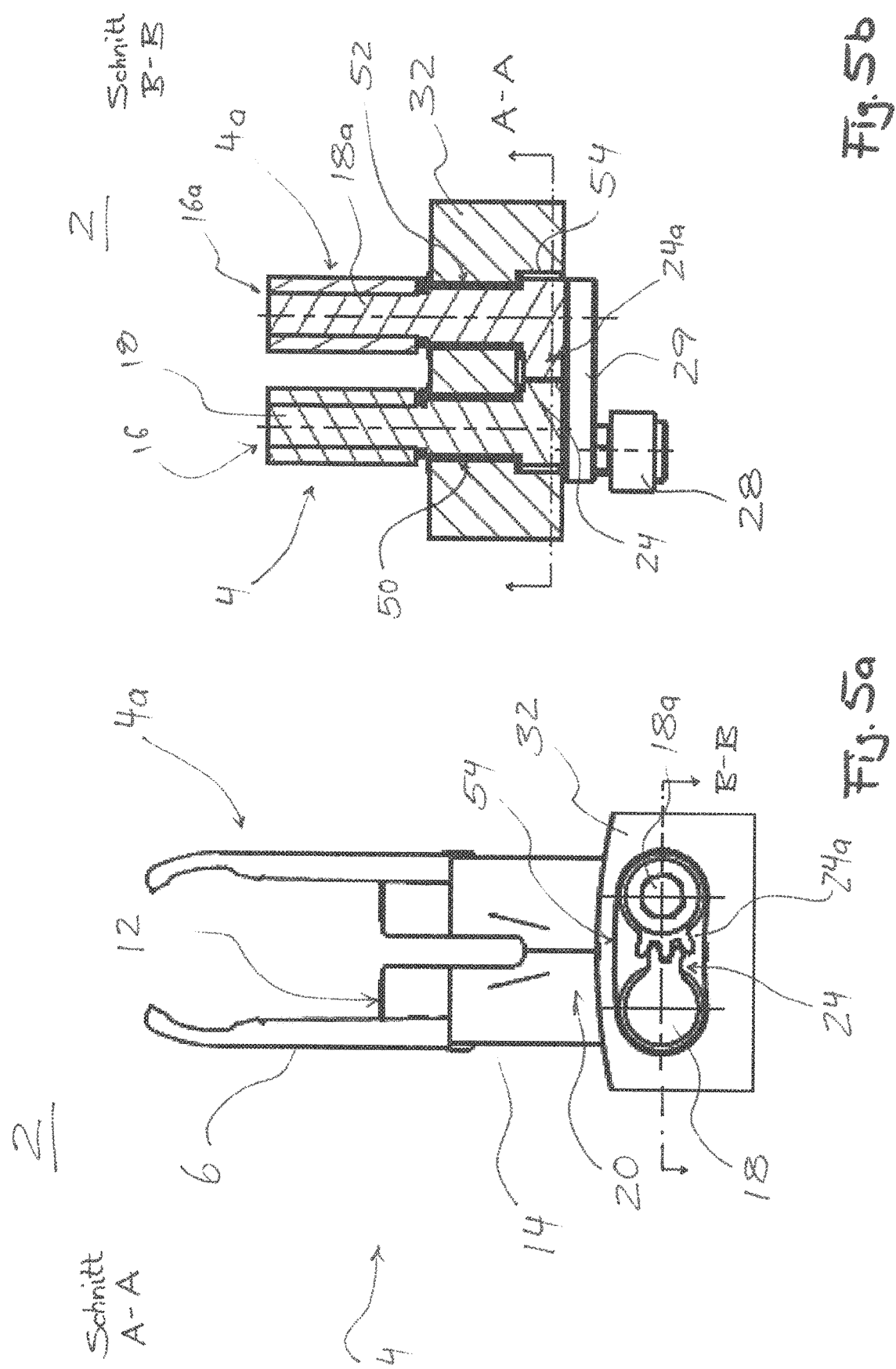
Figure 6:
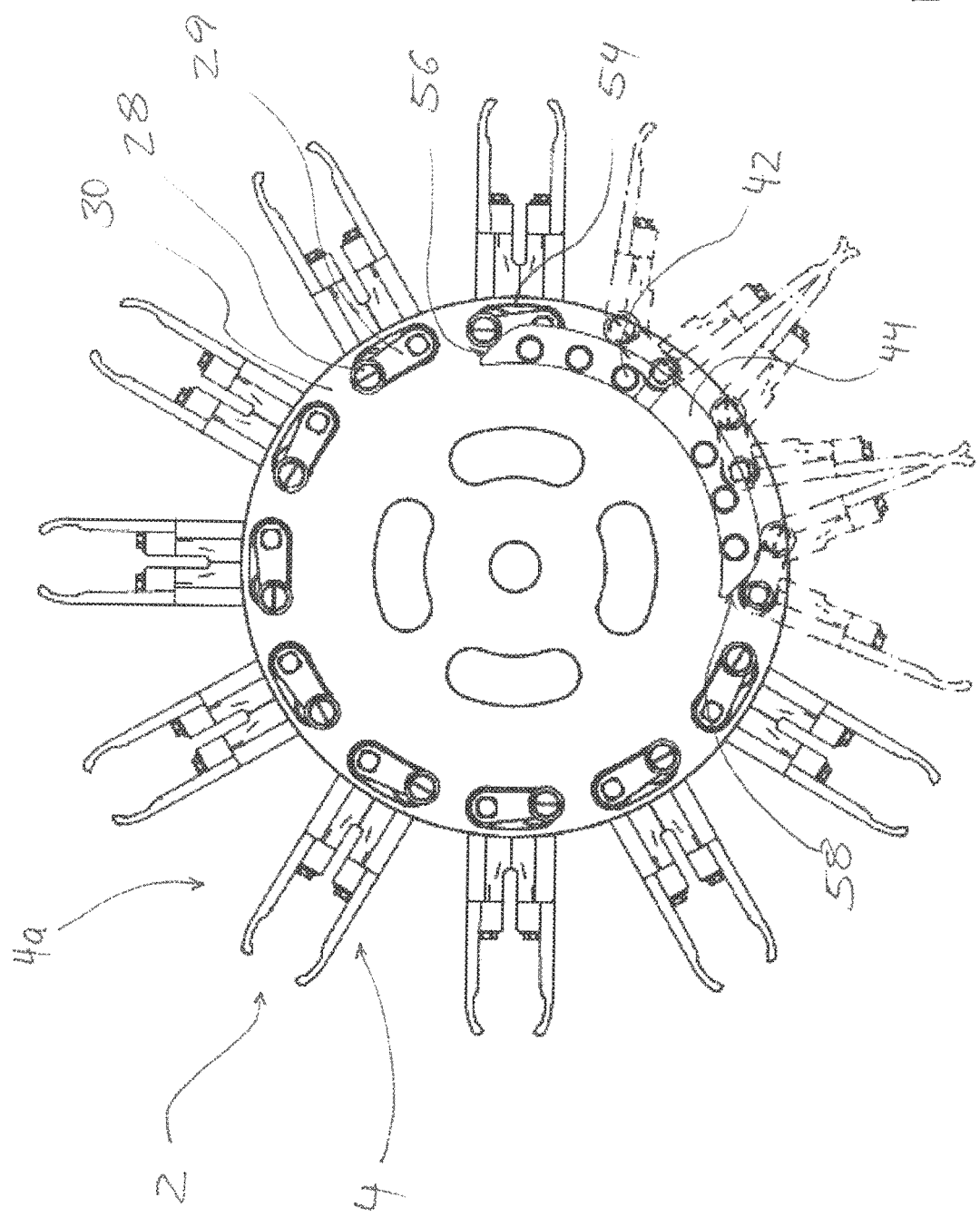
Figure 10B:
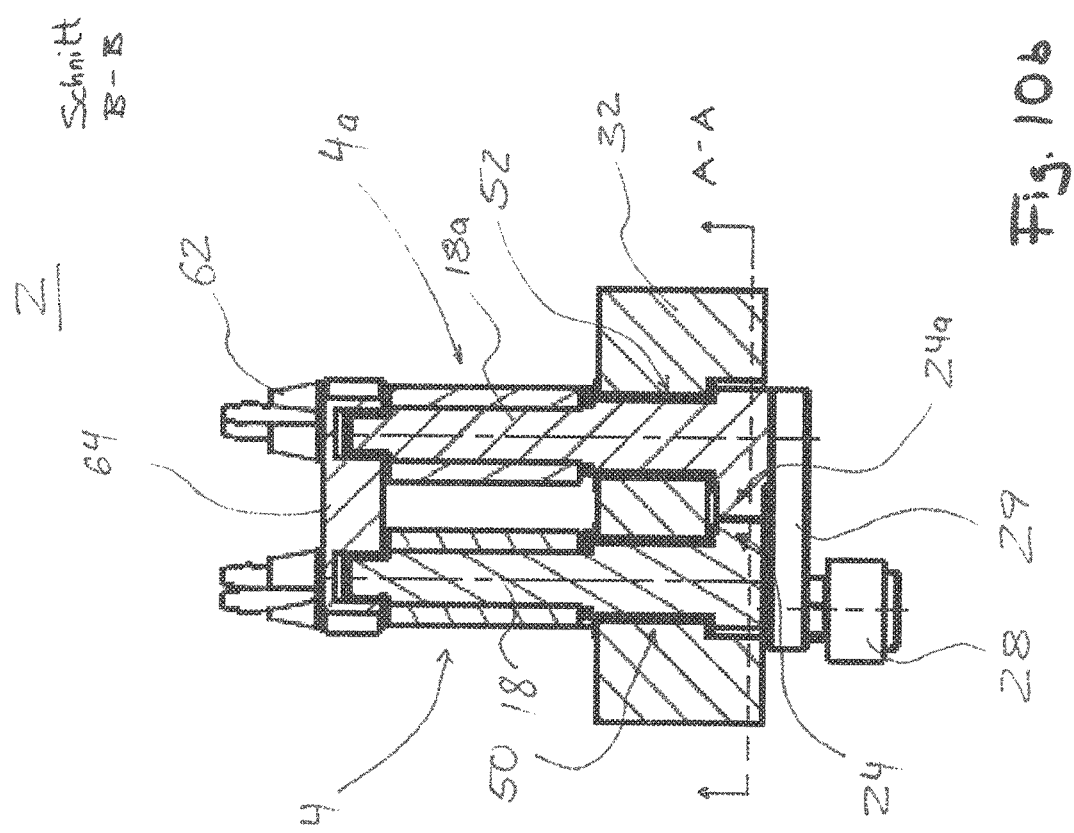
Figure 10A:
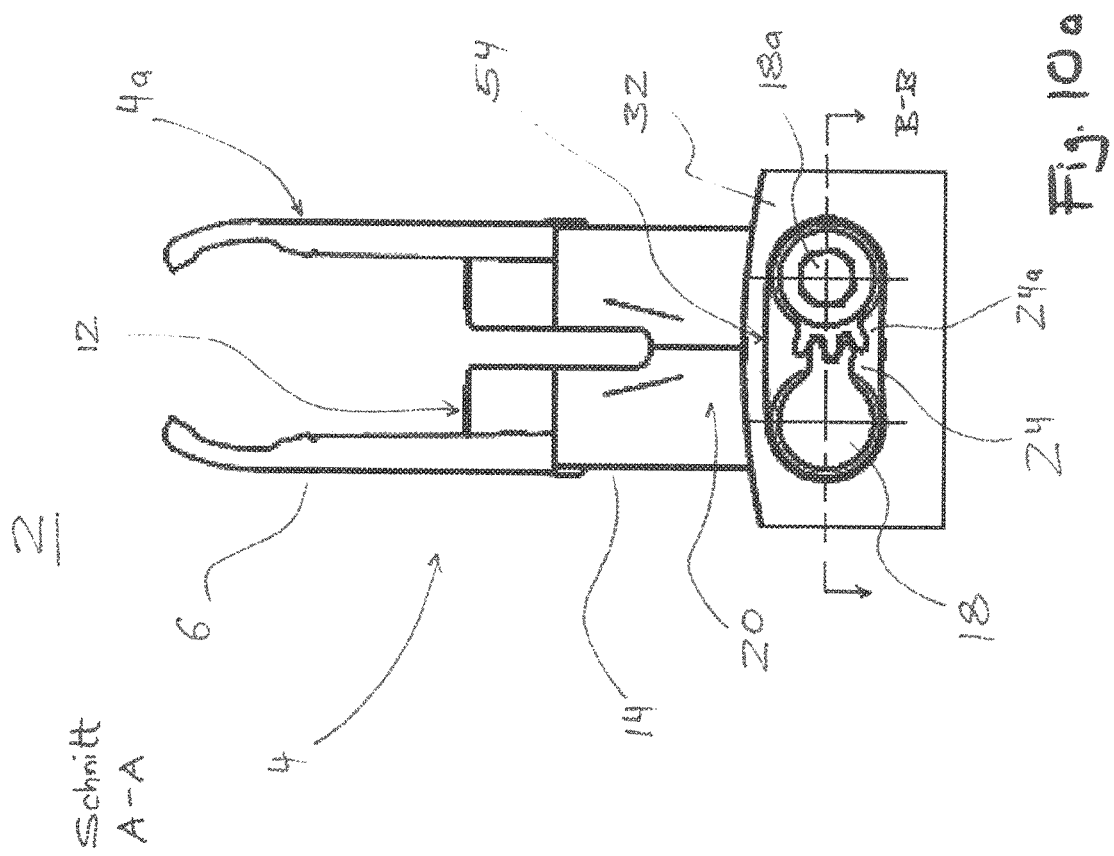

Shown are:

FIG. 1 a perspective view of part of a first transport device having a plurality of gripping devices each respectively comprising two gripper arms according to the invention;

FIG. 2 a further perspective view of the transport device from FIG. 1;

FIG. 3 a perspective view of a second transport device with inventive gripper arms;

FIG. 4 a further perspective view (from below) of the transport device from FIG. 3;

FIG. 5a a schematic side view (from below) of part of an inventive transport device from FIG. 1 in which the gripping device is depicted with two gripper arms;

FIG. 5b a cross section through the side view of FIG. 5a;

FIG. 6 a perspective partial view (from below) of the transport device from FIG. 1;

FIG. 7 a perspective view of a third transport device having a plurality of gripping devices each respectively comprising two inventive gripper arms;

FIG. 8 a further perspective view of the transport device from FIG. 7;

FIG. 9 a further perspective view (from below) of the transport device from FIG. 7;

FIG. 10a a schematic side view (from below) of part of an inventive transport device from FIG. 7 in which the gripping device is depicted with two gripper arms;

FIG. 10b a cross section through the side view of FIG. 10a;

FIG. 11 a perspective view of a fourth transport device having a plurality of gripping devices each respectively comprising two inventive gripper arms;

FIG. 12 a further perspective view of the transport device from FIG. 11;

FIG. 13a four schematic representations (including side and front view) of an inventive gripping device of the transport device from FIG. 11;

FIG. 13b a perspective view of the gripping device from FIG. 13a; and

FIG. 13c a further perspective view of the gripping device from FIG. 13a.

FIG. 1 shows a perspective view of part of a first transport device having a plurality of gripping devices 2, each respectively comprising two inventive gripper arms 4, 4a. The gripping devices 2 all have the same configuration. Moreover, the gripping devices 2 are arranged on and fixed to a circular support plate 30, in particular its support ring 32, concentrically to its center point and equidistanced from one another. The center point is on the same line as a drive shaft (not depicted) of the transport device, whereby the drive shaft is non-rotatably connected to the fixing element 34 of the support plate 30. The height of the support ring 32 is larger than the height of the fixing element 34 since the gripping devices 2 need a more stable mounting surface. The gripping devices 2 are aligned radially to the center point. Each gripping device 2 has a respective gripper arm pair comprised of two gripper arms 4, 4a, wherein one gripper arm 4 is of diametrically opposite configuration to the other gripper arm 4a. Gripper arm 4 comprises a gripper arm body 14 and a grip section 6 with a first and second gripper finger 8, 10. The gripper arm body 14 is rotatably mounted and connected to the support ring 32 by means of a pivot shaft 18 (bearing element) arranged in and non-rotatably connected to a bore 16. Part of the gripper arm body 14 projects beyond the outer edge of the support ring 32. The grip section 6 is aligned outwardly from the support plate 30 so that a gripping device can grasp and hold a container. Additionally to the bore 16, the gripper arm body 14 comprises a mounting 20 and a magnet 22 fixed therein. In this case, the magnets 22 of a gripping device are of opposing polarity and attract. Thus, for example the north pole of the first gripper arm magnet is aligned to the second (oppositely configured) gripper arm of the same gripping device and the south pole of the second gripper arm magnet to the first gripper arm. Furthermore, the gripper arm body 14 is connected to the grip section 6 via a pivot axis 12 in order to allow the grip section 6 to pivot perpendicular to the bore 16 and better grip crooked containers. The two pivot shafts 18 of a gripping device 2 engage with each other by means of effective engagement sections (not depicted), in particular teeth, in order to transfer the pivoting motion of one gripper arm synchronously and evenly to the other gripper arm. One of the pivot shafts 18 of a gripping device 2 is connected to an actuating element 28 via an actuating lever (not depicted). As soon as the actuating element 28 engages with the actuating mechanism 44 and is deflected by a distance/angle, a rotation is transferred to the pivot shaft 18 and thus to the gripper arm 4. This rotation will transfer to the second gripper arm of the same gripping device 2 via the effective engagement section. The actuating mechanism 44 is of circular-segmented configuration and guides the actuating element 28 along its outer face or circular arc respectively, thereby deflecting it and effecting a rotation of the pivot shaft 18 and thus the gripper arm 4. This actuating yields the opening of the gripping device. Further details on the actuating mechanism 44 are disclosed in particular in FIG. 9 and following description. The actuating mechanism 44 is fixed to a mounting frame 36 by fixing screws 42 and disposed at a distance from same. A first and second radially formed recess 38, 40 is configured in the outer edge of the mounting frame 36 in order to be able to serve as a guide for the fixing screws 42. The actuating mechanism 44 can thus be moved prior to its final securing to the mounting frame 36 and the actuating position/angle of the gripping devices 2 fixed.

FIG. 2 shows a further perspective view of the transport device from FIG. 1. In addition to the previously cited features, the actuating lever 29, the actuating mechanism 44 and the mounting frame 36 are also more readily identifiable. The actuating lever 29 here is oriented clockwise from a pivot shaft 18.

FIG. 3 shows a perspective view of a second transport device with gripping devices 2, each comprising two inventive gripper arms 4, 4a respectively. Compared to FIG. 1, the actuating lever 29 is oriented counterclockwise from a pivot shaft 18. Furthermore, the arrangement of the actuating mechanism 44 or at least the guidance of the actuating element 28 respectively is different because in FIG. 3 the actuating element 28 is guided on the inside or chord respectively of the actuating mechanism 44. Due to the different orientation of the actuating lever 29, the actuating element 28 needs to be deflected in the opposite direction to that in FIG. 1 in order to open the gripping device 2. In addition, the effective engagement section 24 of the pivot shafts 18 is visible and can be arranged in a plane with the actuating lever 29, in particular beneath the support ring 32. The actuating lever 29 in FIG. 1 extends over the axes of the pivot shafts 18, which is why the effective engagement sections 24 are arranged above the actuating lever, particularly in a countersink in the support ring 32. A further difference lies in the fixing element 34 which, instead of as a disk, is in this case configured as four projections oriented toward the center point or drive shaft respectively. These projections are fixedly connected to a receiving structure affixed at the end of the drive shaft.

FIG. 4 shows a perspective view of the transport device from FIG. 3 from below. The drive shaft 48 of the transport device and its axially symmetrical outer covering 46 are visible from this perspective. The outer covering 46 is configured in such a manner as to rotatably support the drive shaft 48 and thus not rotate along with it. The mounting frame 36 is moreover fixed to the outer covering 46 in order to maintain the position of the actuating mechanism 44.

FIG. 5a shows a schematic side view (from below) of part of an inventive transport device from FIG. 1 in which the gripping device 2 is depicted with two gripper arms 4, 4a. The effective engagement sections 24, 24a of the two pivot shafts 18, 18a are arranged within a countersink 54 or blind hole or respectively recess formed on the underside of the support ring 32. The countersink 54 is designed such that the effective engagement sections 24, 24a do not hit against the inner edge of the countersink 54 during the pivoting of the pivot shafts 18, 18a. The gripping device 2 is designed such that without thereby holding a container, the gripper arms 4, 4a, and in particular the magnets in the mountings 2, are arranged parallel to each other in the gripping position. A linear cross section B-B runs through the center axis points of the pivot shafts 18, 18a and relates to the following cross-sectional view of FIG. 5b.

FIG. 5b shows a cross section through the side view of FIG. 5a, wherein a linear cross section A-A runs along the underside of the support ring 32 and shows the perspective from FIG. 5a. The two pivot shafts 18, 18a of the gripping device 2 are arranged parallel to each other and are rotatably mounted in a first and second bore 50, 52 of the support ring 32. The depth of the countersink 54 is configured such that the effective engagement sections 24, 24a are substantially arranged in the bore 54. The actuating lever 29 runs parallel to the underside of the support ring 32 but at a far enough distance that the actuating lever 29 is not obstructed in its pivoting motion.

FIG. 6 shows a detail of a schematic bottom view of the transport device from FIG. 1. The countersinks 54 for each gripping device 2 are visible here. Likewise shown is the actuating mechanism 44 with a first driving edge 56 arranged at the beginning and a second driving edge 58 arranged at the end. These edges 56, 58 aid in steadily deflecting the actuating element 28, guiding it to an area at uniform maximum deflection, and subsequently releasing it. The aforementioned area is characterized by an edge of the actuating mechanism 44 having the same distance at each point to the drive shaft (not depicted), in particular its center point.

FIG. 7 shows a perspective view of a third transport device having a plurality of gripping devices 2, each with two inventive gripper arms 4, 4a respectively, wherein this transport device represents a further development of the device from FIG. 1. In the third transport device, the upper sides of the pivot shafts (not visible) extend beyond the bore of the gripper arms and are rotatably supported or arranged respectively in a bearing element/cap 64 of the gripping device 2. The bearing element 64 is preferably a metal plate having two countersinks as a bearing for the pivot shafts and two additional mounting holes. The bearing element 64 is arranged at a specific distance from the support ring 32 by means of two spacer elements 60 and fixed to same with the help of two wing nuts 62.

FIG. 8 shows a further perspective view of the transport device from FIG. 7. The colored depiction makes the different components easier to recognize.

FIG. 9 shows a further perspective view (from below) of the transport device from FIG. 7. The actuating mechanism 44 consists of a first cam component 45x and a second cam component 45y, each exhibiting an upper cam segment 66, 68 and a lower cam segment 67, 69 as well as the first or second driving edge 56, 58. The cam segments of a cam component form a surface which engages with the actuating element 28 and are thereby configured and/or arranged relative each other such that the surface is level, continuous and approximately as wide as the actuating element 28 is tall. The actuating element 28 is thereby deflected the same distance over the entire surface (apart from the driving edges 56, 58) in order to open the gripping device 2. Half of this surface is thereby formed by the upper cam segment 66, 68 and the other half by the lower cam segment 67, 69 so that one cam segment 66, 67, 68, 69 alone can drive and guide the actuating element 28. The four cam segments 66, 67, 68, 69 are all the same height in FIG. 9. Each cam component 45x, 45y is fixed to the mounting frame 36 and spaced at a distance from same by means of three fixing screws 42. The fixing screws 42 of the first cam component 45x are thereby guided, received and fixed in the first arcuate recess 38 of the mounting frame 36 and those of the second cam component 45y in the second arcuate recess 40. The arcuate recesses 38, 40 have the same curvature (or same radius respectively) as the surface of the cam components 45x, 45y engaging with the actuating element 28. The cam components 45x and 45y themselves are designed and displaceable to one another so as to engage with one another and to be able to continuously extend or shorten the afore-mentioned effective surface. When the two cam components 45x, 45y engage, the upper cam segment 66 overlaps the lower cam segment 69 such that the surface is driven forward and the actuating element 28 continuously and steadily guided over it. The distance or respectively gap between the two upper cam segments 66, 68 as well as between the two lower cam segments 67, 69 thus has no effect on the deflecting of the actuating element 28, particularly due to the same height of the element 28 to the height of the actuating mechanism 44. With these gaps, the actuating element 28 is deflected or respectively guided only by the upper cam segment 66 or the lower cam segment 69. It is noted at this point that the actuating mechanism 44 can be formed from one or more inter-telescoping cam components which are each integrally formed or comprise a plurality of cam segments arranged atop one another. It is likewise emphasized that the actuating mechanism from FIGS. 3 and 4 can exhibit the same features as the actuating mechanism from FIG. 9 in order to accordingly configure and adapt the effective surface in FIGS. 3 and 4 (not on the exterior but on the interior).

FIG. 10a shows a schematic side view (from below) of part of an inventive transport device from FIG. 7 in which the gripping device is depicted with two gripper arms. This side view is essentially identical to FIG. 5a, albeit additionally illustrates section path B-B for the following FIG. 10b.

FIG. 10b shows a cross section through the side view of FIG. 10a, which is essentially identical to FIG. 5b, although the bearing element 64 and the two wing nuts 62 can additionally be seen. Likewise evident is the special design to the upper side of the pivot shafts 18, 18a: the radius of the pivot shafts is thereby smaller than the rest of the pivot shafts. This upper part is rotatably arranged in corresponding countersinks of the bearing element 64.

FIGS. 11 and 12 show a perspective view of a fourth transport device having a plurality of gripping devices each respectively comprising two inventive gripper arms. In contrast to the gripping devices from FIGS. 7 and 8, the bearing elements 64 of the gripping devices 2 are in each case fixed to the support ring 32 at a spacing by means of only one hexagon bolt 70 and one spacer element 60. This exemplary embodiment requires fewer components compared to the gripping device from FIG. 7 and is thus more economical and easier to manufacture as well as easier to install and more maintenance-friendly. Advantageously, the bearing element 64 and the spacer element(s) 60 (see FIG. 7 and others with respect to multiple spacer elements) can be integrally formed or connected together by material bond or press fitting. The closure means (not visible) are arranged and covered in the gripper arm bodies of the gripper arms 4, 4a.

FIG. 13a shows four schematic representations (including side and front view) of an inventive gripping device 2 of the transport device from FIG. 11. The middle left illustration in particular shows the parallel arrangement of the pivot shafts 18, 18a to one another, the perpendicular orientation of the effective engagement sections 24 and actuating lever 29 to the shafts 18, 18a, as well as the parallel arrangement of the effective engagement sections 24 to the lever 29. FIGS. 13b and 13c show perspective views of the gripping device 2 from FIG. 13a.

LIST OF REFERENCE NUMERALS 2 gripping device
4 gripper arm
6 grip section
8 first gripper finger
10 second gripper finger
12 pivot axis
14 gripper arm body
16 bore
18 pivot shaft (bearing element)
20 mounting (blind hole)
22 closure means (magnet)
24 effective engagement section (toothed section)
26 tooth of toothed section
28 actuating element
29 actuating lever
30 support plate
32 support ring of support plate
34 fixing element of support plate
36 mounting frame
38 first recess
40 second recess
42 fixing screw
44 actuating mechanism (cam device/cam control)
45x first cam component
45y second cam component
46 outer covering
48 drive shaft
50 first bore for the pivot axis of the first gripper arm
52 second bore for the pivot axis of the second gripper arm
54 recess for effective engagement section (countersink)
56 first driving edge
58 second driving edge
60 spacer element
62 wing nut
64 bearing element/cap
67 upper cam segment (of first cam component 45x)
67 lower cam segment (of first cam component 45x)
68 upper cam segment (of second cam component 45y)
69 lower cam segment (of second cam component 45y)
70 hexagon bolt
a all the reference numerals with an "a" refer to the second gripper arm of mirror-inverted configuration to the first gripper arm

What is claimed is:

1. An apparatus comprising:
   a first gripper arm for a gripping device configured and arranged to grip, hold and guide bottle-like containers,
   a bore included in the first gripper arm for receiving a bearing element configured and arranged to function as a first pivot shaft to pivotally fix the first gripper arm to the gripping device; and
   a closure within a mounting of the first gripper arm for moving the first gripper arm from an open position into a gripping position, the bore non-rotatably connecting with the bearing element to transfer a pivoting motion from the bearing element to the first gripper arm to move the first gripper arm from the gripping position to the open position.

2. The apparatus of claim 1, wherein the first gripper arm further comprises:
   a toothed section having teeth and arranged coaxially at least in segments around the bore on an inner side of the first gripper arm to enable the first gripper arm to synchronously pivot with a second gripper arm of the gripping device, the second gripper arm arranged in a mirror-inverted configuration with the first gripper arm.

3. The apparatus of claim 1 further comprising:
   an actuating element included on the first pivot shaft for actuating the first pivot shaft.

4. The apparatus of claim 1, wherein the first pivot shaft is integrally formed with the first gripper arm.

5. The apparatus of claim 2, wherein the first gripper arm further comprises:
   a grip section pivotally supported about a pivot axis perpendicular to the bore.

6. The apparatus of claim 5, wherein the mounting is configured and arranged as a blind hole in a gripper arm body of the gripper arm between the bore and the grip section.

7. The apparatus of claim 1, wherein the first pivot shaft of the first gripper arm further comprises:
   a tooth section having teeth and arranged coaxially at least in segments around the first pivot shaft on an inner side of the first gripper arm to enable the first gripper arm to synchronously pivot with a second pivot shaft of a second gripper arm arranged in a mirror-inverted configuration with the first gripper arm.

8. The apparatus of claim 7, wherein the first gripper arm includes a grip section pivotally supported about a pivot axis perpendicular to the bore, and wherein the mounting is configured and arranged as a blind hole in a gripper arm body of the gripper arm between the bore and the grip section.

9. The apparatus of claim 1, wherein the first gripper arm further comprises:
   a grip section pivotally supported about a pivot axis perpendicular to the bore.

10. The apparatus of claim 1, wherein the closure includes one of an attracting pair of magnets and a repelling pair of magnets.

11. An apparatus comprising:
    a gripper arm pair for a gripping device configured and arranged to grip, hold and guide bottle-like containers, the gripper arm pair arranged in a mirror-inverted configuration;
    a bore included in each gripper arm of the gripper arm pair for receiving a bearing element configured and arranged to function as a pivot shaft to pivotally fix a respective gripper arm to the gripping device, the bore non-rotatably connecting with the bearing element in order to transfer a pivoting motion from the bearing element to the respective gripper arm to enable movement of the respective gripper arm from a gripping position to an open position;
    a closure within a mounting of each gripper arm for moving each gripper arm from the open position to the gripping position, wherein each gripper arm has a section of the closure;

a toothed section of each gripper arm having teeth and arranged coaxially at least in segments around the bore on an inner side of each gripper arm to enable a first gripper arm to synchronously pivot with a second gripper arm of the gripper arm pair; and an actuating element configured and arranged on the pivot shaft of the first gripper arm for actuating the pivot shaft of the first gripper arm.

12. The apparatus of claim 11 further comprising:

a transport device including a plurality of gripping devices;

a support plate to accommodate the gripping devices;

a drive shaft for rotating the support plate; and an actuating mechanism for controlling the actuating element of each gripping device.

13. The apparatus of claim 12, wherein the actuating mechanism is fixed in one position and is configured and arranged to drive the actuating element of the respective gripping device to enable the respective gripping device to shift to the open position, hold the open position at an angle, and to thereafter move to the gripping position.

14. The apparatus of claim 13 wherein each gripping device further comprises:

an attachment element for rotatably supporting the pivot shaft, and wherein the attachment element is fixedly connected to the support plate.

15. The apparatus of claim 14, wherein the support plate further comprises:

two bearing element bores for each gripping device to support the pivot shaft; and a countersink connecting the two bearing bores, wherein the toothed section of the pivot shafts is configured and arranged inside the countersink.

16. The apparatus of claim 12 wherein each gripping device further comprises:

an attachment element for rotatably supporting the pivot shaft, and wherein the attachment element is fixedly connected to the support plate.

17. The apparatus of claim 12, wherein the support plate further comprises:

two bearing bores for each gripping device to support the pivot shaft, wherein the toothed section is configured and arranged beneath the support plate.

18. The apparatus of claim 12, wherein the support plate further comprises:

two bearing element bores for each gripping device to support the pivot shaft; and a countersink connecting the two bearing bores, wherein the toothed section of the pivot shaft is configured and arranged inside the countersink.

19. The apparatus of claim 13 wherein each gripping device further comprises:

an attachment element for rotatably supporting the pivot shaft, and wherein the attachment element is fixedly connected to the support plate.

20. An apparatus comprising:

a gripper arm pair for a gripping device configured and arranged to grip, hold and guide bottle-like containers, the gripper arm pair arranged in a mirror-inverted configuration;

a bore included in each gripper arm for receiving a bearing element configured and arranged to function as a pivot shaft to pivotally fix the respective gripper arm to the gripping device, the bore non-rotatably connecting with the bearing element to transfer a pivoting motion from the bearing element to the respective gripper arm to move the respective gripper arm from a gripping position to an open position;

a closure within a mounting of each gripper arm for moving the respective gripper arm from the open position to the gripping position, wherein each gripper arm has a section of the closure;

a toothed section of each gripper arm having teeth and arranged coaxially at least in segments around the bore on an inner side of each gripper arm to enable a first gripper arm to synchronously pivot with a second gripper arm of the gripper arm pair;

an actuating element configured and arranged on the pivot shaft of the first gripper arm for actuating the pivot shaft of the first gripper arm; and an attachment element for rotatably supporting the pivot shaft of the gripper arms, wherein the attachment element is fixedly connected to a support plate accommodating the gripping device.

* * * * *